United States Patent
Yang et al.

(10) Patent No.: US 12,322,389 B2
(45) Date of Patent: Jun. 3, 2025

(54) BLUETOOTH CONTROL METHOD AND DEVICE FOR HEATED CLOTHING

(71) Applicant: GUANGZHOU ISSYZONE TECHNOLOGY CO., LIMITED, Guangzhou (CN)

(72) Inventors: Taiping Yang, Shenzhen (CN); Yalei Zhu, Pingdingshan (CN)

(73) Assignee: GUANGZHOU ISSYZONE TECHNOLOGY CO., LIMITED, Guangzhou (CN)

( * ) Notice: Subject to any disclaimer, the term of this patent is extended or adjusted under 35 U.S.C. 154(b) by 264 days.

(21) Appl. No.: 18/206,817

(22) Filed: Jun. 7, 2023

(65) Prior Publication Data
US 2024/0379099 A1 Nov. 14, 2024

(30) Foreign Application Priority Data
May 11, 2023 (CN) .......................... 202310529622.2

(51) Int. Cl.
*G10L 15/00* (2013.01)
*G10L 15/08* (2006.01)
*G10L 15/22* (2006.01)
*A41D 13/005* (2006.01)

(52) U.S. Cl.
CPC .............. *G10L 15/22* (2013.01); *G10L 15/08* (2013.01); *A41D 13/0051* (2013.01); *G10L 2015/088* (2013.01); *G10L 2015/223* (2013.01)

(58) Field of Classification Search
CPC .......... H05B 1/02; H05B 1/0272; G10L 15/22
See application file for complete search history.

(56) References Cited

U.S. PATENT DOCUMENTS

| | | | |
|---|---|---|---|
| 2016/0295934 A1* | 10/2016 | Wu | H05B 1/0272 |
| 2017/0265533 A1* | 9/2017 | Gueritee | H05B 3/342 |
| 2018/0331701 A1* | 11/2018 | Chang | H04B 1/088 |
| 2019/0281903 A1* | 9/2019 | Amarasiriwardena | H05B 3/342 |
| 2024/0138497 A1* | 5/2024 | Yang | F24F 13/08 |
| 2025/0040629 A1* | 2/2025 | Robell | A41D 1/002 |

FOREIGN PATENT DOCUMENTS

CN 111493388 A 8/2020

* cited by examiner

*Primary Examiner* — Daniel Abebe
(74) *Attorney, Agent, or Firm* — Birchwood IP

(57) ABSTRACT

A Bluetooth control method for heated clothing, comprising the following steps: acquiring a voice signal by a voice module, and generating a control command according to a characteristic signal contained in the voice signal; determining a type of control command by a host, if the control command belongs to a type I control command, then sending the type I control command to a jacket heating device through wired transmission, the type I control command triggers the jacket heating device to perform on-off operation, if the control command belongs to the type II control command, then sending the type II control command to a Bluetooth broadcast channel, and each slave receives the type II control command from the Bluetooth broadcast channel, parses and identifies an address code contained in the type II control command, the address code only triggers one slave to control a non-jacket heating device to perform on-off operation.

10 Claims, 4 Drawing Sheets

BLUETOOTH CONTROL METHOD AND DEVICE FOR HEATED CLOTHING

CROSS-REFERENCE TO RELATED APPLICATIONS

This application claims the benefit and priority of Chinese patent application No. 202310529622.2, filed on May 11, 2023, disclosure of which is hereby incorporated by reference in its entirety.

TECHNICAL FIELD

The present application relates to the technical field of smart clothing, in particular to a Bluetooth control method and device for heated clothing.

BACKGROUND

Heated clothing is clothing or accessories composed of ordinary or special clothing and a heating device. Commonly available heated clothing in the market today includes: heated jackets, heated pants, heated gloves, heated socks, etc. Generally speaking, there should be no wired connection between different parts of the clothes. On the one hand, it is difficult to undress, and on the other hand, it is not aesthetically pleasing. Therefore, in the conventional control logic, each product in the whole set of heated clothing will be individually configured with a control button to control the on and off of the power supply. The above-mentioned separate control is not only loaded down with trivial details, but also needs to bend over to operate buttons for the socks on the feet. Or, when the clothes on the user's upper body are relatively thick, even the buttons on the trousers cannot be operated in an upright state, which causes inconvenience in use.

CN111493388A discloses a smart clothing based on microservice management, which can communicate with people through voice recognition VUI technology, and through the dialogue, the clothing can be automatically heated and kept warm. However, this smart clothing can only perform voice control on the jacket with a microphone, and cannot control the heating devices in the pants and socks due to the limitation of environmental noise and distance.

SUMMARY

Aiming at the problem of inconvenient control of multiple heating products throughout the body, the present invention proposes a Bluetooth control method and device for heated clothing, aiming at controlling multiple heating devices through a single voice input.

In order to solve the above technical problems, the first aspect of the present invention proposes a Bluetooth control method for heated clothing, i comprising the following steps:
  acquiring a voice signal by a voice module, and generating a control command according to a characteristic signal contained in the voice signal;
  determining a type of control command by a host, if the control command belongs to a type I control command, then sending the type I control command to a jacket heating device through wired transmission, the type I control command triggers the jacket heating device to perform on-off operation, if the control command belongs to the type II control command, then sending the type II control command to a Bluetooth broadcast channel, and each slave receives the type II control command from the Bluetooth broadcast channel, and parses and identifies an address code contained in the type II control command, the address code only triggers one slave to control a non-jacket heating device to perform on-off operation.

In some embodiments, the control command comprises an identification code, the host determines the type of the control command according to the identification code, and matches a corresponding transmission channel for the control command according to the type.

In some embodiments, before the generating the control command, continuously determining whether an ambient sound contains a wake-up sentence, if so, waking up the voice module, and if not, continuously sleeping the voice module.

In some embodiments, when the voice module is in a wake-up state, if no control command is generated within a specified duration, the voice module will go into sleep.

In some embodiments, the specified duration is set to 10-60 seconds.

In some embodiments, the address code triggers at least two of the slaves to control the corresponding non-jacket heating device to perform the on-off operation, and after the non-jacket heating device performs the on-off operation, the corresponding slaves send feedback signals to the host, if the host does not receive all of the feedback signals within a preset time, then resending the type II control command to the Bluetooth broadcast channel.

In some embodiments, the voice module comprises a writable voice comparison library, wherein the characteristic signal is extracted from the voice signal and converted into text, if the text matches keywords in the voice comparison library, then generating the corresponding control command.

The second aspect of the present invention proposes a Bluetooth control device for heated clothing, comprising:
  a voice module, configured to acquire a voice signal, and generate a control command according to a characteristic signal contained in the voice signal;
  a host, configured to determine a type of control command, if the control command belongs to a type I control command, then sending the type I control command to a jacket heating device through wired transmission, the type I control command triggers the jacket heating device to perform on-off operation, if the control command belongs to the type II control command, then sending the type II control command to a Bluetooth broadcast channel, and each slave receives the type II control command from the Bluetooth broadcast channel, and parses and identifies an address code contained in the type II control command, the address code only triggers one slave to control a non-jacket heating device to perform on-off operation.

The third aspect of the present invention proposes a Bluetooth control device for heated clothing, the device comprises a memory, a processor and a communication module, wherein,
  the memory is configured to store executable program codes;
  the processor is coupled to the memory;
  the processor invokes the executable program code stored in the memory to execute the above-mentioned Bluetooth control method for heated clothing.

The fourth aspect of the present invention provides a computer-storable medium, the computer storage medium stores computer commands, and when the computer commands are invoked, it executes the above-mentioned Bluetooth control method for heated clothing.

The beneficial effects of the present invention are: the host controls the non-jacket heating device to perform on-off operation through Bluetooth broadcasting, thereby reducing environmental noise, increasing the distance of voice control, effectively avoiding bending over, and inconvenient operations by hand.

DETAILED DESCRIPTION

The technical solution in the embodiment of the present application will be clearly and completely described below in conjunction with the accompanying drawings in the embodiment of the present application. Apparently, the described embodiments are only some of the embodiments of the present application, rather than all the embodiments. Based on the embodiments in the present application, all other embodiments obtained by a person skilled in the art without making creative efforts belong to the protection scope of the present application.

It should be understood that when used in this specification and the appended claims, the terms "comprising" and "comprises" indicate the presence of described features, integers, steps, operations, elements and/or components, but do not exclude the existence or addition of one or more other features, integers, steps, operations, elements, components and/or collections thereof.

It should also be understood that the terminology used in the specification of the present application is for the purpose of describing particular embodiments only and is not intended to limit the present application. As used in this specification and the appended claims, the singular forms "a", "an" and "the" are intended to include plural referents unless the context clearly dictates otherwise.

It should also be further understood that the term "and/or" used in the description of the present application and the appended claims refers to any combination and all possible combinations of one or more of the associated listed items, and includes these combinations.

As used in this specification and the appended claims, the term "if" may be construed as "when" or "once" or "in response to determining" or "in response to detecting" depending on the context. Similarly, the phrase "if determined" or "if [the described condition or event] is detected" may be construed, depending on the context, to mean "once determined" or "in response to the determination" or "once detected [the described condition or event]" or "in response to detection of [described condition or event]".

First Embodiment

This embodiment proposes a Bluetooth control method for heated clothing. The host controls non-jacket heating devices to perform on-off operations through Bluetooth broadcasting, thereby reducing environmental noise, increasing the distance of voice control, and effectively avoiding bending over and scenes where it is inconvenient to operate with hands.

Figure 1:
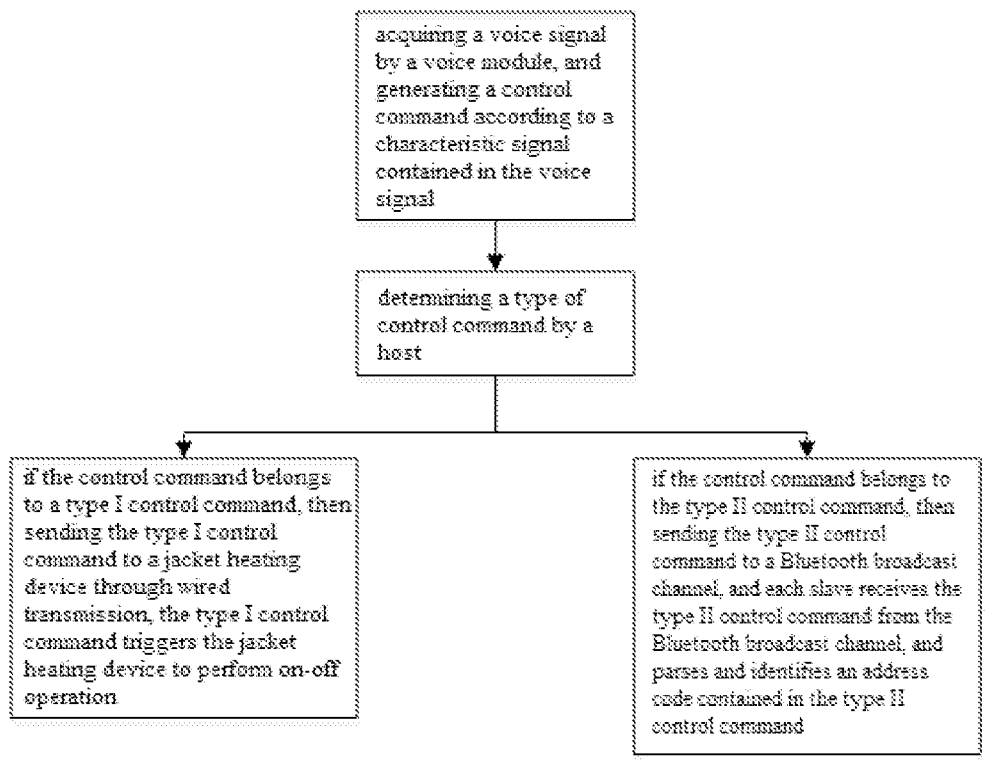
FIG. 1 is a schematic flow chart of the Bluetooth control method for heated clothing disclosed in the first embodiment of the present application.

Please refer to FIG. 1, FIG. 1 is a schematic flowchart of a Bluetooth control method for heated clothing disclosed in an embodiment of the present application. As shown in FIG. 1, the following steps are comprised:

acquiring a voice signal by a voice module, and generating a control command according to a characteristic signal contained in the voice signal;

determining a type of control command by a host, if the control command belongs to a type I control command, then sending the type I control command to a jacket heating device through wired transmission, the type I control command triggers the jacket heating device to perform on-off operation, if the control command belongs to the type II control command, then sending the type II control command to a Bluetooth broadcast channel, and each slave receives the type II control command from the Bluetooth broadcast channel, and parses and identifies an address code contained in the type II control command, the address code only triggers one slave to control a non-jacket heating device to perform on-off operation.

There are two main implementations of voice recognition: one is to call the voice development kit directly in the embedded processor; the other is to expand the voice chip on the periphery of the embedded processor. The first method has a large amount of programs and complex calculations, requires a large amount of processor resources, and has a long development cycle; The second method is relatively simple. It only needs to pay attention to the interface part of the voice chip connected to the microprocessor. The structure is simple and easy to build. The calculation burden of the microprocessor is greatly reduced, the reliability is enhanced, and the development period is shortened. Therefore, this embodiment uses the solution of the voice module. The voice module mentioned above is non-specific person recognition. Non-specific person identification means that the identification object is aimed at most users. In this embodiment, it is mainly used for extracting characteristic signals from voice signals and generating corresponding control commands. For example, if the user outputs the voice "coat heating", the voice module recognizes the keywords "coat" and "heating" in the sentence, and then outputs the corresponding control command according to the matching. Similarly, if the user outputs the voice "pants heating", the voice module recognizes the keywords "pants" and "heating" in the sentence, and then outputs corresponding control command according to the matching.

The above-mentioned host mainly includes computing functions and Bluetooth transmission functions. In this embodiment, the host receives the control command from the voice module, first determine the attribute of the control command, classifies it as a type I control command or type II control command, and then selects the wired control or Bluetooth radio according to its attribute. According to the tasks that the host needs to undertake, it can be equipped with a microprocessor chip for calculation, and a Bluetooth SOC as a signal transmission module for control command transmission.

The above-mentioned slave only includes a one-way Bluetooth transmission function, and can only passively receive control commands sent intermittently in the broadcast channel.

In this embodiment, the jacket heating device is embedded in the voice module and the host, which has the functions of voice recognition and Bluetooth communication, and other non-jacket heating devices (including but not limited to pants, gloves or socks) are embedded in the slave, which only has the function of Bluetooth communication, which handshakes through the identification of the master and each slave. When the user puts on the jacket, the control command should be generated first through the recognition function of the voice module, and then the host will transmit the control command to different channels according to the situation. For the control command for the jacket heating device, the host directly controls the jacket heating device by wire, and for the control command for the non-jacket heating device, the host broadcasts the control command to each slave through Bluetooth communication. Only one slave finally executes the corresponding operation, so that the slave can be controlled indirectly and quickly, thereby avoiding the problems of environmental noise and control distance, while reducing the number of the hardware modules used by the slave and reducing production costs.

Second Embodiment

Figure 2:
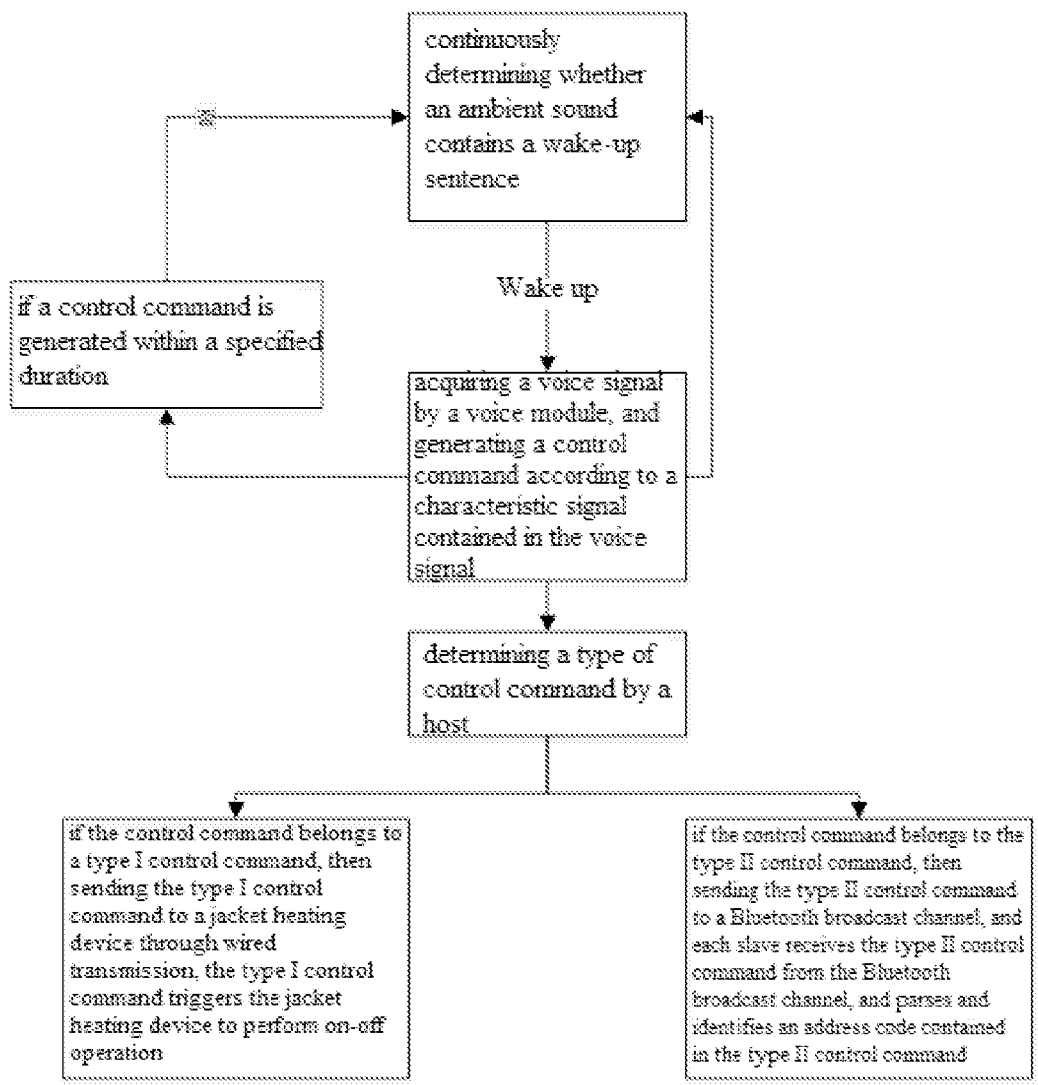
FIG. 2 is a schematic flowchart of another Bluetooth control method for heated clothing disclosed in the second embodiment of the present application.

Please refer to FIG. 2. FIG. 2 is a schematic flowchart of another Bluetooth control method for heated clothing disclosed in the embodiment of the present application. As shown in FIG. 2, it includes the following steps:

Before the generating the control command, continuously determining whether an ambient sound contains a wake-up sentence, if so, waking up the voice module, and if not, continuously sleeping the voice module.

When the voice module is in a wake-up state, if no control command is generated within a specified duration, the voice module will go into sleep, wherein the specified duration is set to 10-60 seconds. In this embodiment, the generation of control command is used as the trigger condition for the voice module to enter the sleep state, instead of simply using the wake-up sentence as the trigger condition for the voice module to prolong the wake-up state, which can prevent the voice module from going to sleep when the user continues to issue voice control. Assume that the specified duration is set to 10 seconds, and the user needs to send multiple voice signals during the period. According to the general control logic, if the user does not send a wake-up sentence within 10 seconds, the voice module will sleep by itself. Therefore, in this embodiment, within the timing range of the specified duration, if it is detected that the user sends out a voice signal, the specified duration is reset, that is, the countdown is restarted. Obviously, the sleep trigger logic proposed in this solution prevents the voice module from entering sleep during the actual operation of the user, which greatly improves the user experience.

The voice module acquires a voice signal, and generating a control command according to a characteristic signal contained in the voice signal; the control command comprises an identification code, the host determines the type of the control command according to the identification code, and matches a corresponding transmission channel for the control command according to the type. The voice module comprises a writable voice comparison library, wherein the characteristic signal is extracted from the voice signal and converted into text, if the text matches keywords in the voice comparison library, then generating the corresponding control command.

The host determines a type of control command, if the control command belongs to a type I control command, then sending the type I control command to a jacket heating device through wired transmission, the type I control command triggers the jacket heating device to perform on-off operation, if the control command belongs to the type II control command, then sending the type II control command to a Bluetooth broadcast channel, and each slave receives the type II control command from the Bluetooth broadcast channel, and parses and identifies an address code contained in the type II control command, the address code only triggers one slave to control a non-jacket heating device to perform on-off operation.

In another optional example, a one-to-many control solution of hosts is also provided. The address code triggers at least two of the slaves to control the corresponding non-jacket heating device to perform the on-off operation, and after the non-jacket heating device performs the on-off operation, the corresponding slaves send feedback signals to the host, if the host does not receive all of the feedback signals within a preset time, then resending the type II control command to the Bluetooth broadcast channel. In this solution, since a type II control command needs to trigger and control two slaves, the data packet of the type II control command will become larger, and the risk of transmission failure will increase. Therefore, the corresponding slave needs to send a feedback signal to the host, and the host is responsible for verifying the feedback signal, and triggering the operation of resending the type II control command according to the situation. In addition, the preset time should be set at 1 second or less.

The host in this embodiment mainly includes computing functions and Bluetooth transmission functions. In this embodiment, the host receives the control command from the voice module, first determine the attribute of the control command, classifies it as a type I control command or type II control command, and then selects the wired control or Bluetooth radio according to its attribute. Secondly, the host also needs to judge the collected feedback signal.

The slave in this embodiment includes a bi-directional Bluetooth transmission function, which can passively receive control commands sent intermittently in the broadcast channel, and can also return a feedback signal to the host after receiving the control commands.

Third Embodiment

Figure 3:
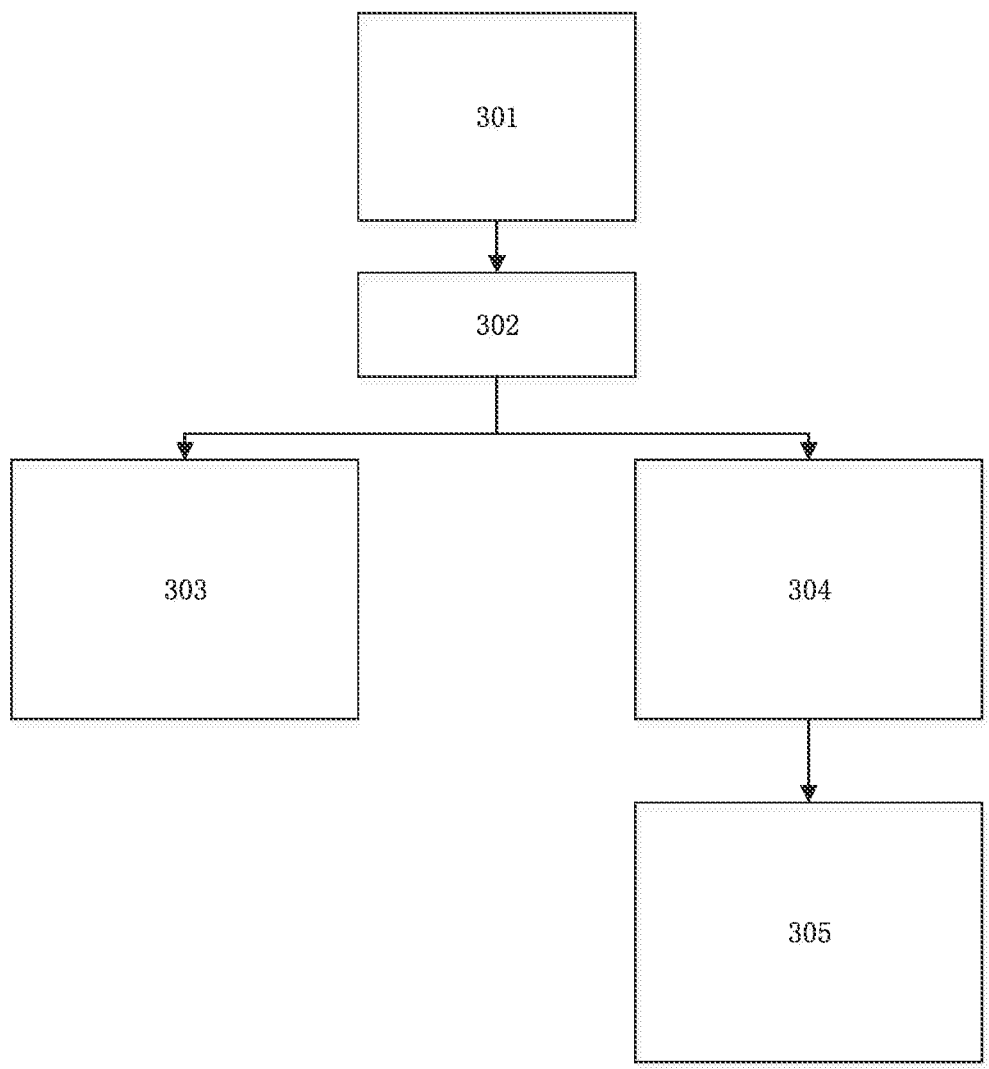
FIG. 3 is a schematic structural diagram of a Bluetooth control device for heated clothing disclosed in the third embodiment of the present application.

Please refer to FIG. 3. FIG. 3 is a schematic structural diagram of a Bluetooth control device for heated clothing disclosed in an embodiment of the present application. As shown in FIG. 3, comprising:

a voice module 301, configured to acquire a voice signal, and generate a control command according to a characteristic signal contained in the voice signal;

a host 302, configured to determine a type of control command, if the control command belongs to a type I control command, then sending the type I control command to a jacket heating device 303 through wired transmission, the type I control command triggers the jacket heating device 303 to perform on-off operation, if the control command belongs to the type II control command, then sending the type II control command to a Bluetooth broadcast channel, and each slave 304 receives the type II control command from the Bluetooth broadcast channel, and parses and identifies an address code contained in the type II control command, the address code only triggers one slave 304 to control a non-jacket heating device 305 to perform on-off operation.

In this embodiment, the structures and functions of the voice module, host and slave can refer to the Bluetooth control method for heated clothing described in any one of first and second Embodiments, and will not be repeated here.

Fourth Embodiment

Figure 4:
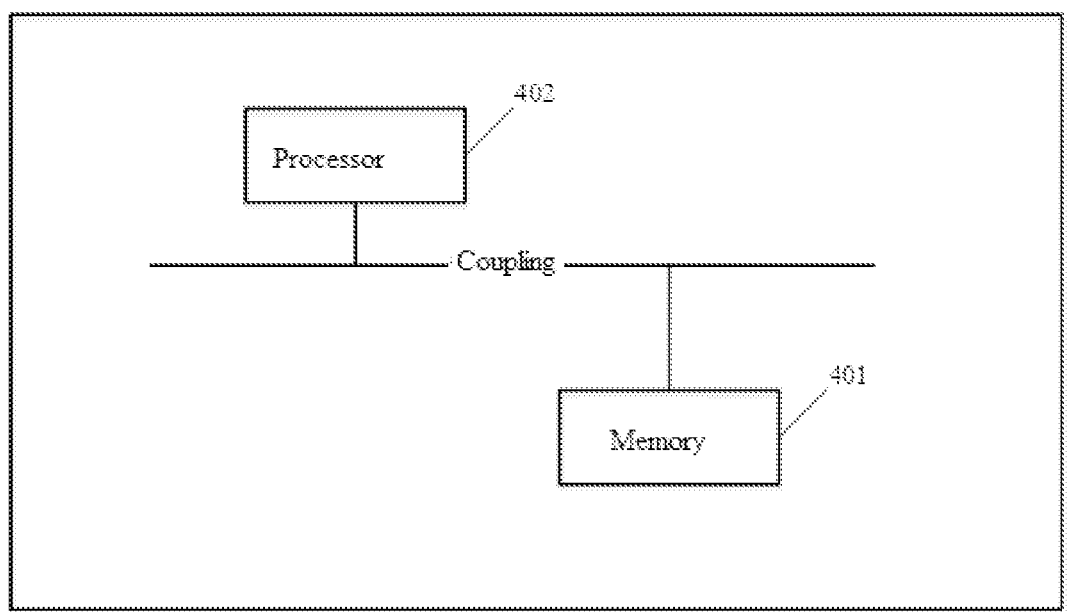
FIG. 4 is a schematic structural diagram of another Bluetooth control device for heated clothing disclosed in the fourth embodiment of the present application.

Please refer to FIG. 4. FIG. 4 is a schematic structural diagram of another Bluetooth control device for heated clothing disclosed in the embodiment of the present application. As shown in FIG. 4, the control platform may comprise:
- a memory, storing executable program codes;
- a processor 402 coupled to the memory 401;
- the processor 402 invokes the executable program code stored in the memory 401 to execute the steps in the Bluetooth control method for heating clothing described in any one of the first or second embodiment.

Fifth Embodiment

The embodiment of the present application discloses a computer program product, the computer program product comprises a non-transitory computer-readable storage medium storing a computer program, and the computer program is operable to make the computer execute the steps in the Bluetooth control method for heated clothing described in any one of the first or second embodiment.

The device embodiments described above are only illustrative, and the modules described as separate components may or may not be physically separated, and the components shown as modules may or may not be physical modules, that is, they may be located in one place, or it can be distributed to multiple network modules. Part or all of the modules can be selected according to actual needs to achieve the purpose of the solution of this embodiment. It can be understood and implemented by those skilled in the art without any creative effort.

Through the specific description of the above embodiments, those skilled in the art can clearly understand that each implementation manner can be implemented by means of software plus a necessary general-purpose hardware platform, and of course also by hardware. Based on this understanding, the essence of the above technical solution or the part that contributes to the existing technology can be embodied in the form of software products. The computer software product can be stored in a computer-readable storage medium, and the storage medium includes Read-Only Memory (ROM), Random Access Memory (RAM), Programmable Read-only Memory (PROM), Erasable Programmable Read Only Memory (EPROM), One-time Programmable Read-Only Memory (OTPROM), Electronically Erasable Rewritable Read-Only Memory (EEPROM), CD-ROM (Compact Disc Read-Only Memory) or other optical disc storage, magnetic disk storage, tape storage, or any other computer-readable medium that can be used to carry or store data.

Finally, it should be noted that: a Bluetooth control method and device for heated clothing disclosed in the embodiment of the present application is only a preferred embodiment of the present application, and is only used to illustrate the technical solution of the present application, not to limit it. Although the present application has been described in detail with reference to the aforementioned embodiments, those skilled in the art should understand that they can still modify the technical solutions described in the aforementioned embodiments, or perform equivalent replacements for some of the technical features. However, these modifications or replacements do not make the essence of the corresponding technical solutions deviate from the spirit and scope of the technical solutions of the various embodiments of the present application.

The above-mentioned embodiments are just to illustrate the technical concept and features of the present application, and the purpose is to enable those of ordinary skill in the art to understand the content of the present application and implement it accordingly, and not to limit the protection scope of the present application. All equivalent changes or modifications made according to the essence of the content of the application shall fall within the protection scope of the present application.

What is claimed is:

1. A Bluetooth control method for heated clothing, comprising the following steps:
acquiring a voice signal by a voice module, and generating a control command according to a characteristic signal contained in the voice signal;
determining a type of control command by a host, if the control command belongs to a type I control command, then sending the type I control command to a jacket heating device through wired transmission, the type I control command triggers the jacket heating device to perform on-off operation, if the control command belongs to the type II control command, then sending the type II control command to a Bluetooth broadcast channel, and each slave receives the type II control command from the Bluetooth broadcast channel, and parses and identifies an address code contained in the type II control command, the address code only triggers one slave to control a non-jacket heating device to perform on-off operation.

2. The Bluetooth control method for heated clothing according to claim 1, wherein the control command comprises an identification code, the host determines the type of the control command according to the identification code, and matches a corresponding transmission channel for the control command according to the type.

3. The Bluetooth control method for heated clothing according to claim 1, wherein: before the generating the control command, continuously determining whether an ambient sound contains a wake-up sentence, if so, waking up the voice module, and if not, continuously sleeping the voice module.

4. The Bluetooth control method for heated clothing according to claim 3, wherein when the voice module is in a wake-up state, if no control command is generated within a specified duration, the voice module will go into sleep.

5. The Bluetooth control method for heated clothing according to claim 4, wherein the specified duration is set to 10-60 seconds.

6. The Bluetooth control method for heated clothing according to claim 1, wherein the address code triggers at least two of the slaves to control the corresponding non-jacket heating device to perform the on-off operation, and after the non-jacket heating device performs the on-off operation, the corresponding slaves send feedback signals to the host, if the host does not receive all of the feedback signals within a preset time, then resending the type II control command to the Bluetooth broadcast channel.

7. The Bluetooth control method for heated clothing according to claim 1, wherein the voice module comprises a writable voice comparison library, wherein the characteristic signal is extracted from the voice signal and converted into text, if the text matches keywords in the voice comparison library, then generating the corresponding control command.

8. A computer-storage medium, the wherein computer-storage medium stores computer commands, and when the computer commands are invoked, the computer commands execute the Bluetooth control method for heated clothing according to claim 1.

9. A Bluetooth control device for heated clothing, comprising:
- a voice module, configured to acquire a voice signal, and generate a control command according to a characteristic signal contained in the voice signal;
- a host, configured to determine a type of control command, if the control command belongs to a type I control command, then sending the type I control command to a jacket heating device through wired transmission, the type I control command triggers the jacket heating device to perform on-off operation, if the control command belongs to the type II control command, then sending the type II control command to a Bluetooth broadcast channel, and each slave receives the type II control command from the Bluetooth broadcast channel, and parses and identifies an address code contained in the type II control command, the address code only triggers one slave to control a non-jacket heating device to perform on-off operation.

10. The Bluetooth control device for heated clothing according to claim 9, wherein the device comprises a memory, a processor and a communication module, wherein,
- the memory is configured to store executable program codes;
- the processor is coupled to the memory;
- the processor invokes the executable program code stored in the memory to execute the Bluetooth control method for heated clothing according to claim 1.

* * * * *